United States Patent [19]

Dobrzanski

[11] 4,171,486

[45] Oct. 16, 1979

[54] IONIZATION SMOKE DETECTOR WITH CONTROLLED SENSITIVITY

[75] Inventor: John Dobrzanski, New Britain, Conn.

[73] Assignee: Emhart Industries, Inc., Farmington, Conn.

[21] Appl. No.: 829,352

[22] Filed: Aug. 31, 1977

[51] Int. Cl.$^2$ .................... G01T 1/18

[52] U.S. Cl. .................... 250/381

[58] Field of Search .................... 250/381; 340/237 S

[56] References Cited

U.S. PATENT DOCUMENTS

| | | | |
|---|---|---|---|
| 3,909,815 | 9/1975 | Cacogne | 250/381 X |
| 4,017,733 | 4/1977 | Ishii et al. | 250/381 |

*Primary Examiner*—Davis L. Willis

*Attorney, Agent, or Firm*—McCormick, Paulding & Huber

[57] ABSTRACT

An ionization smoke detector is provided with a ventilated sensing chamber and housing which cooperate to improve and control smoke sensitivity by reducing adverse effects of external winds or drafts. The detector includes a housing having arcuate openings arranged in a circle and a flared deflector mounted within the circle in order to direct smoke and other particulate matter into the interior of the housing. A smoke sensing chamber is positioned within the housing adjacent the openings and has a cylindrical shell electrode defining arcuate ventilating apertures registering with the arcuate openings of the housing to pass smoke and particulate matter in and out of the chamber in cooperation with the flared deflector. The shell electrode and the housing cooperate to control the flow of smoke through the chamber and thereby improve smoke sensitivity.

8 Claims, 4 Drawing Figures

IONIZATION SMOKE DETECTOR WITH CONTROLLED SENSITIVITY

BACKGROUND OF THE INVENTION

The present invention relates to an ionization smoke detector and more particularly, a detector having a housing and sensing chamber which cooperate to control the flow of detected smoke or aerosols having entrained particulate matter.

Ionization smoke detectors are utilized to detect the presence of fires or unsafe smoke conditions and operate by admitting a small portion of air in the monitored environment to a sensing chamber. Convection currents and drafts are generally employed to move smoke-laden air through the sensing chamber. The rate and manner in which air flows through the chamber can have a significant effect upon the sensitivity to smoke at unsafe or hazardous levels. For this reason, a number of detectors as disclosed in U.S. Pat. Nos. 3,731,093, 3,908,957 and 3,935,465 are provided with means for controlling the manner in which ambient air drifts into and through a sensing chamber. In general, special baffling arrangements are provided to control the air and attenuate disturbances caused by wind and strong drafts.

In ionization smoke detectors, winds or drafts have several adverse effects upon sensitivity. First of all, the detector utilizes a radioactive ionizing source that ionizes air between two electrically charged electrodes in the sensing chamber so that a very low ionization current flows even under normal, no-smoke conditions. When unsafe smoke conditions prevail, particulate matter carried by the smoke into the sensing chamber reduces ion flow and the current, and detection circuitry responding to the reduced current is utilized to trigger an alarm signal. Unfortunately, a strong draft or wind through the chamber can remove ions from the chamber faster than they are generated which also reduces the ionization current. Since the detection circuitry is incapable of distinguishing between reduced current caused by smoke and reduced current caused by winds, a false alarm signal can be sounded by the wind in the absence of an unsafe condition.

Accordingly, it is the general object of the present invention to provide an ionization smoke detector which controls air flow through the sensing chamber and maintains sensitivity to smoke conditions in the presence of winds or drafts that exist in smoke-laden air. More specifically, it is an object of the present invention to provide an ionization smoke detector which controls the rate at which air passes through the sensing chamber under all types of wind and draft conditions.

SUMMARY OF THE INVENTION

The present invention resides in an ionization smoke detector having a housing and an ionization or sensing chamber mounted within. A wall of the housing includes a plurality of openings through which smoke and other particulate matter can pass between the interior and exterior of the housing.

The sensing chamber is a ventilated ionization chamber mounted within the housing interior and is positioned adjacent the openings defined by the housing wall. The chamber is comprised of an interior electrode, an exterior electrode and an ionizing source, typically a radioactive material. When a voltage is applied to the electrodes, an ionization current generated with the aid of air ionized by the source flows through the chamber.

The exterior electrode is situated adjacent the openings of the housing and has a plurality of apertures registering respectively with the plurality of openings in the housing for receiving substantially all of the particulate matter passing inwardly through the openings.

A flared deflector situated centrally of the openings prevents smoke-laden air from flowing past the openings and guides the air into the sensing chamber. The chamber provides baffling which reduces the effects of drafts internally without impeding the flow of smoke-laden air through the chamber under unsafe smoke conditions.

DESCRIPTION OF PREFERRED EMBODIMENT

Figure 1:
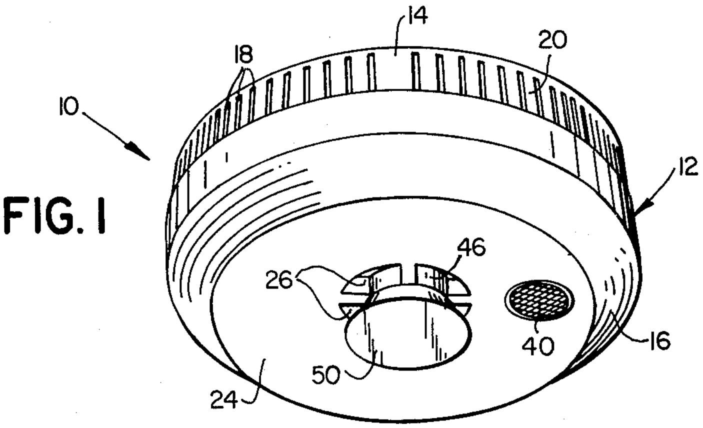
FIG. 1 is a perspective view of an ionization smoke detector embodying the present invention.
Figure 2:
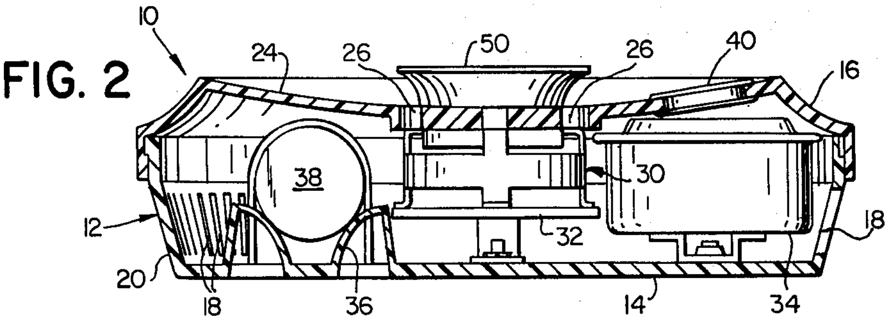
FIG. 2 is a cross-sectional view of the ionization smoke detector in FIG. 1 and illustrates the positioning of the sensing chamber within the detector housing.

FIGS. 1 and 2 illustrate an ionization smoke detector incorporating the features of the present invention. The detector, generally designated 10, is comprised of a housing 12 in which the sensing and electrical elements of the detector are enclosed and which is utilized to mount the detector to a wall, ceiling or other structure in the environment where smoke and other aerosols are to be detected. The housing is basically a two-part structure having a mounting base 14 and a cover 16 removably attached to the base. For example, the base and cover may have mating tangs and grooves which form a twist lock to hold the two components together when the cover is slipped over the base and rotated slightly.

The lower sidewall 20 of the base 14 as viewed in FIG. 2 tapers outwardly from the bottom of the generally cylindrical housing and includes a plurality of circumaxially disposed ventilating openings 18 which allow smoke and particulate matter carried by air to drift in and out of the interior of the housing. The tapered sidewall insures that smoke drifting over a surface to which the detector is mounted is captured adjacent the housing and directed inwardly through the openings 18. A major portion of the cover 16 as viewed in FIG. 2 has a generally concave surface 24 on its exterior which funnels smoke toward a plurality of arcuate openings 26 arranged in a circle at the center. Therefore, smoke approaching the detector 10 from any side is induced toward openings which lead to the interior of the housing 12.

A ventilated sensing chamber 30 is positioned within the housing and is disposed substantially in obstructing relationship with the central openings 26. The chamber is mounted on a panel or printed circuit board 32 which contains the detection and alarm circuitry for energizing a smoke alarm annunciator such as the horn 34. A protective screen 40 is mounted in the cover 16 or the cover has an integral grill directly above the horn 34 to prevent attenuation of the sound emitted by the horn. The illustrated detector 10 contains its own power source in the form of a battery 38 supported in a battery bracket 36 molded integrally into the base 14. In a preferred embodiment of the invention, the housing is a molded plastic which provides structural protection for the mounted components and provides a pleasing external appearance. For a more detailed illustration and description of an ionization smoke detector of this type and its operation, reference may be had to U.S. Pat. No. 3,934,145 issued to Dobrzanski and Hart.

In accordance with the present invention, the detector 10 has been designed to control the rate at which smoke and other particulate matter passes from the exterior of the housing into the interior and through the ventilated sensing chamber 30. The control is obtained primarily through a cooperative relationship of the housing 12 and the sensing chamber 30.

Figure 4:
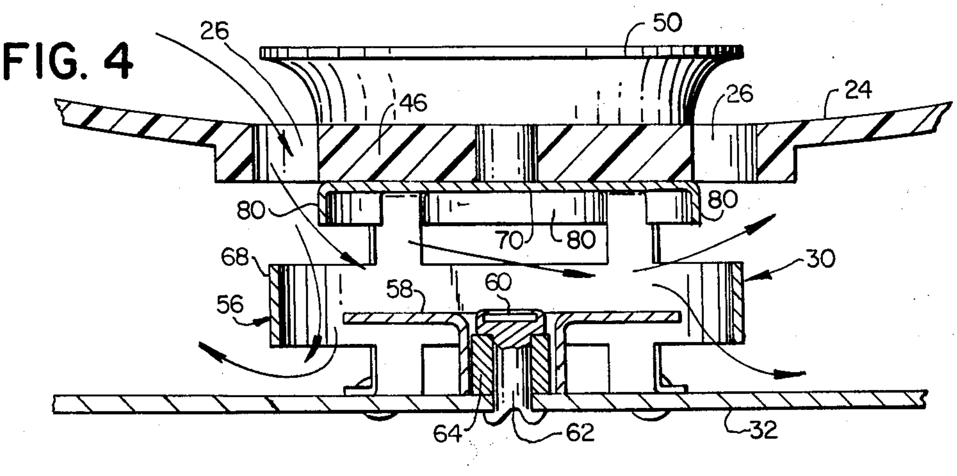
FIG. 4 is an enlarged fragmentary sectional view of the ionization smoke detector in FIG. 2 and shows the sensing chamber at the openings of the housing.

As shown most clearly in FIG. 4, the central openings 26 of the cover 16 are distributed about a plug 46 located centrally in the cover and form a plurality of passageways having generally arcuate shapes which are most apparent in FIG. 1. Mounted centrally of the cover 16 and arcuate passageways on the exterior of the housing is a flared deflector 50 which captures smoke drifting along the concave surface 24 of the cover and directs the smoke through one or more of the passageways located around the periphery of the deflector and plug. Thus, if the smoke is carried by a strong draft or wind across the cover 16, the flared deflector 50 projects into the path of the smoke, and the deflector and the concave surface 24 cooperate to direct the smoke toward the interior of the housing. Since the deflector and housing are symmetrically formed about a central axis through the detector from the base to the cover, the sensitivity of the detector is omnidirectional.

The sensing chamber 30 is designed to cooperate with the peripheral passageways and includes a cylindrical external electrode 56 mounted on the circuitboard 32, an internal electrode 58 also mounted on the circuitboard, and an ionizing source 60 formed of a radioactive material mounted on the circuitboard by means of a pedestal 62. If desired, an insulated spacer 64 may be positioned between the pedestal and internal electrode 58 so that the source 60 is mounted centrally within the electrode and approximately in the same plane as the emitting surface of the electrode and in electrically isolated relationship from the electrode.

In operation, a voltage differential is developed between the electrodes 56 and 58. The source 60 ionizes air and particles in the electrostatic field between the electrodes so that an ionization current flows through the field. When smoke particles enter the open interior space of the chamber between the two electrodes, they impede the flow of ions and reduce the ionization current. Such reductions are used to trigger the detection circuitry and sound the alarm annunciator 34. Accordingly, it is desirable to direct the flow of smoke outside of the detector inwardly through the peripheral passageways of the openings 26 or through the openings 18 and into the electrostatic field established between the electrodes 56 and 58. Since the electrodes forming the sensing chamber have a circular and cylindrical form and are mounted coaxially of each other, it is preferable to deflect the smoke toward the center of the chamber where the source 60 produces the ionization and principal ion flow.

Figure 3:
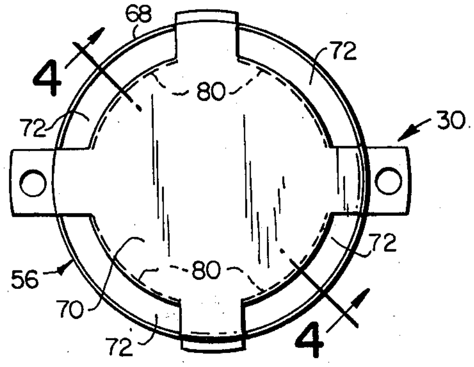
FIG. 3 is a top plan view of the sensing chamber shown in FIG. 2 at a slightly enlarged scale.

To this end, the cylindrical external electrode 56 has a shell-configuration with a cylindrical sidewall 68 and a circular end or roof 70 supported by the sidewall and situated adjacent the arcuate openings of the housing in parallel relationship with the inner electrode 58. As shown most clearly in FIGS. 3 and 4, the sidewall and roof of the external electrode 56 are perforated or cut away to form four arcuate ventilating apertures or slots 72. Preferably, the external electrode 56 is formed of a metallic sheet material and the ventilating apertures are provided with skirt members 80 depending axially from the roof 70 into the chamber at the inside edges of the apertures. Furthermore, the chamber 30 is mounted on the circuitboard 32 so that the four arcuate apertures register respectively with the four peripheral passageways formed by the openings 26 in the cover 20.

Consequently, substantially all smoke and particulate matter passing through the passageways in the cover also pass through the external electrode 56 to or from the interior of the sensing chamber and affect the ionization current in the chamber. The skirt member and the interior electrode 58 serve as baffles to prevent strong drafts of air from creating excessive air velocity in the interior of the sensing chamber and insure that smoke remains briefly within the chamber because of the circuitous path that must be followed. Additionally, drafts containing no smoke or particulate matter can not remove ions rapidly from the chamber and create a false smoke alarm by reducing the ionization current.

The exterior electrode 56 is supported in spaced relationship above the circuitboard 32 so that the lower edge of the cylindrical wall 68 defines an annular ventilating opening through which smoke can enter or leave the chamber. Thus, as illustrated in FIG. 4, smoke-laden air may reach the interior of the housing through the openings 26 in the cover 20, pass downwardly through the arcuate apertures of the external electrode 56 into the interior space of the sensing chamber between the electrodes 56 and 58 and then pass out of the chamber through either the arcuate apertures above or the annular openings defined between the lower edge of the cylindrical wall 68 and the circuit-board 32.

In summary, the flared deflector 50 on the exterior of the cover 20 insures that smoke-laden air does not bypass the detector and is directed into the housing through the cover openings 26. The sensing chamber 30 is positioned with the arcuate apertures in the external electrode registering with the passageways through the cover openings 26 to receive the inwardly directed smoke. The sensing chamber 30 is well ventilated to insure that smoke flows into and through the chamber, and the skirt members together with the internal electrode form a system of baffles which prevent the detector from being overly sensitive to the wind and drafts. Accordingly, an ionization smoke detector has been disclosed in which the sensing chamber and the housing are uniquely formed to cooperate in directing smoke into the electrostatic field within the chamber and to control the flow of smoke without undue sensitivity to winds and drafts.

While the present invention has been described in a preferred embodiment, it should be understood that numerous modifications and substitutions can be had without departing from the spirit of the invention. For example, although the invention has been disclosed in a battery powered detector, the type of power supply is not concerned with the invention. Various materials may be employed for the housing and chamber but the chamber must contain electrically conductive electrodes. Therefore, a thin metallic material for the chamber shell is preferred. The chamber is advantageously mounted on the circuitboard 32 containing the detection circuitry and electrical components but other mounts can be used. The deflector 50 may be formed as an integral part of the cover 16 and plug 46 or separately for subsequent installation. Accordingly, the present invention has been described in a preferred embodiment by way of illustration rather than limitation.

I claim:

1. An ionization smoke detector comprising: a housing having a wall enclosing the housing interior and defining a plurality of openings though which smoke and other particulate material can pass between the interior and exterior of the housing, the openings being arcuate in shape and arranged in a circle in the wall of the housing; and a ventilated ionization chamber mounted within the housing interior and positioned adjacent the openings defined by the housing wall, the chamber having an interior electrode, an exterior electrode defining a ventilated chamber space and an ionizing source for ionizing air within the chamber and allowing an ionization current to flow between the electrodes when a voltage differential is applied across the electrodes, the exterior electrode being a cylindrical shell mounted within the housing coaxially of the circle of openings through the wall of the housing and having a cylindrical sidewall and a circular end supported by the sidewall adjacent the arcuate openings of the housing, the sidewall and circular end cooperating to define arcuate slots registering with the arcuate openings of the housing to receive substantially all of the smoke and particulate matter passing inwardly through the openings.

2. An ionization smoke detector as defined in claim 1 further including a deflector mounted on the exterior of the housing within the circle of arcuate openings to direct smoke and particulate matter into the ionization chamber.

3. An ionization smoke detector as defined in claim 1 wherein a flared deflector is mounted on the exterior of the housing centrally of the openings arranged in a circle to direct the flow of smoke and particulate matter into the ionization chamber.

4. An ionization smoke detector as defined in claim 1 wherein:

a panel is provided in the interior of the housing;

the interior electrode of the chamber is mounted on the panel within the cylindrical shell in parallel relationship with the circular end; and the cylindrical shell is also mounted on the panel with the cylindrical sidewalls spaced above the panel whereby an annular ventilating opening is provided between the panel and the sidewall.

5. An ionization smoke detector as defined in claim 1 wherein the circular end of the cylindrical shell includes skirt members extending axially from the end into the chamber space along the inside edges of the arcuate slots.

6. An ionization smoke detector comprising:

a housing having an interior space and a plurality of arcuate shaped slots arranged in a circle at one side of the housing and leading between the housing exterior and the interior space;

an omnidirectional deflector located on the exterior of the housing and projecting outwardly from the side of the housing into the path of smoke from a position centrally within the circle of arcuate slots for deflecting smoke and other particulate matter approaching the housing from any of a plurality of directions into the housing interior through the slots;

a sensing chamber mounted in the interior space of the housing and having an outer shell forming one electrode and an inner electrode positioned within the chamber space defined by the outer shell, the sensing chamber being mounted in the housing adjacent said one side with the outer shell in obstructing relationship with the arcuate slots, the shell further having a plurality of apertures registering respectively with the arcuate slots to receive substantially all of the smoke and particulate matter deflected into the housing by the deflector.

7. An ionization smoke detector as defined in claim 6 wherein the omnidirectional deflector is a flared deflector mounted centrally in the circle of arcuate apertures on the exterior of the housing.

8. An ionization chamber as defined in claim 6 wherein the outer shell of the sensing chamber has a generally cylindrical shape with cylindrical sidewalls and a circular end supported by the sidewalls in parallel relationship with the inner electrode, the circular end being formed with a plurality of arcuate apertures at its periphery and being mounted adjacent said one side of the housing with the apertures in registration with the arcuate slots in said side of the housing.

* * * * *

UNITED STATES PATENT AND TRADEMARK OFFICE

CERTIFICATE OF CORRECTION

PATENT NO. : 4,171,486

DATED : October 16, 1979

INVENTOR(S) : JOHN DOBRZANSKI

It is certified that error appears in the above–identified patent and that said Letters Patent are hereby corrected as shown below:

COLUMN 4, LINE 39 "circuit-board" should be --circuitboard--.

COLUMN 5, LINE 12 "though" should be --through--.

Signed and Sealed this

*Eleventh* Day of *March 1980*

[SEAL]

*Attest:*

SIDNEY A. DIAMOND

*Attesting Officer*

*Commissioner of Patents and Trademarks*